(No Model.)
J. E. DEWEESE.
WHEEL FOR VEHICLES.
No. 314,520. Patented Mar. 24, 1885.
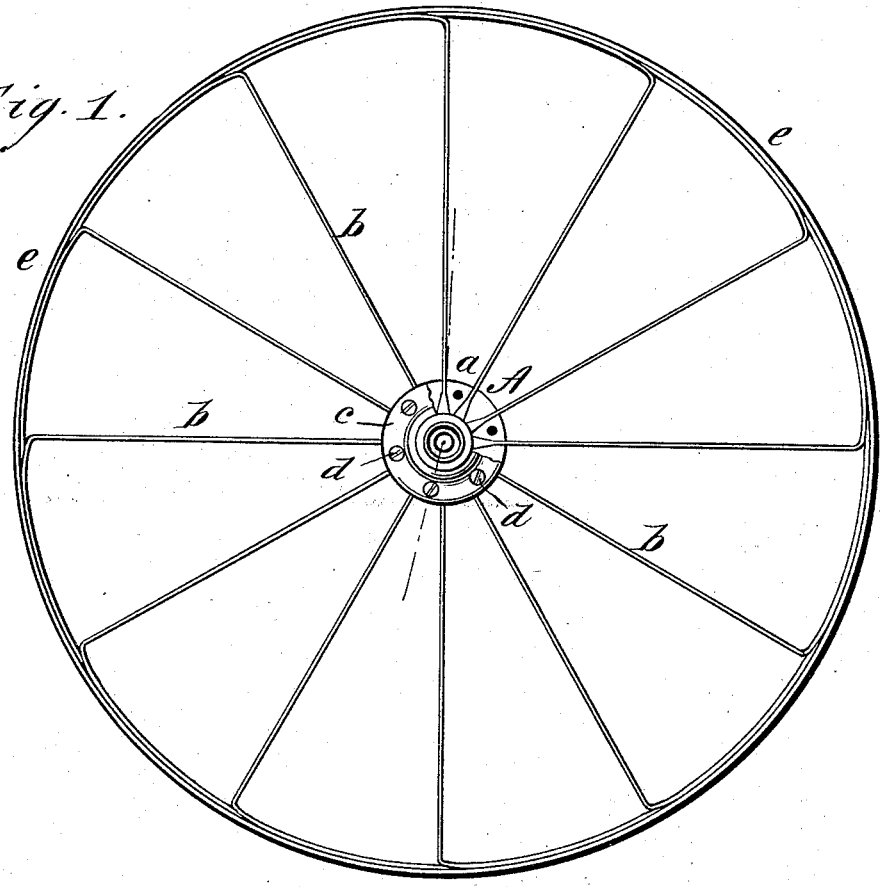
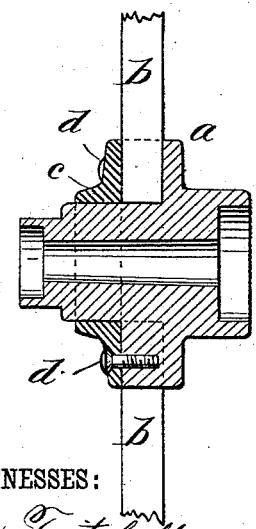
WITNESSES:
Donn Twitchell
C. Sedgwick
INVENTOR
J. E. Deweese
BY
Munn & Co
ATTORNEYS.

UNITED STATES PATENT OFFICE.

JAMES E. DEWEESE, OF NEVADA, MISSOURI.

WHEEL FOR VEHICLES.

SPECIFICATION forming part of Letters Patent No. 314,520, dated March 24, 1885.

Application filed June 10, 1884. (No model.)

*To all whom it may concern:*

Be it known that I, JAMES E. DEWEESE, of Nevada, in the county of Vernon and State of Missouri, have invented a new and useful Improvement in Wheels for Vehicles, of which the following is a full, clear, and exact description.

The object of my invention is to construct a light and durable wheel entirely of iron and steel, for use with any kind of vehicle; and to these ends it consists in the novel construction hereinafter described and claimed.

Reference is to be had to the accompanying drawings, forming a part of this specification, in which similar letters of reference indicate corresponding parts in both the figures.

Figure 1 is a side elevation of a wheel of the improved construction, and Fig. 2 is a section of the hub portion.

The hub A is of cast metal, and is made with a flange, $a$, that is grooved radially to receive the dovetailed or enlarged ends of spokes $b$, which are clamped by a ring, $c$, attached around the hub-body by screws $d$, entering flange $a$. The spokes $b$ are thin strips of metal, preferably spring-steel. Their outer ends are bent to the form of the rim $e$, the bent end of each being of a length to extend to the next spoke and lap upon the angle or heel thereof, so that the rim is re-enforced or made double throughout. The tire is to be shrunk on the rim $e$, and no bolts are needed.

For buggies the spokes and rim can be made of very thin and light material, and for the heaviest vehicle the wheel made as above will be comparatively light, and yet very durable. The spokes cannot get loose, and, if necessary, any one can readily be replaced when injured. The tire remains always tight, and the wheel, as a whole, can be made and repaired more cheaply than wooden ones.

Having thus described my invention, I claim as new and desire to secure by Letters Patent—

The vehicle-wheel comprising the hub having dovetailed sockets and the removably-bolted plate, the rim, and the thin spring-metal spokes, with their inner ends formed with dovetailed shoulders or enlargements, and with their outer portions curved and sprung to conform to and re-enforce the rim, the free ends of such curved and sprung portions lapping the heels of the adjacent curved and sprung portions, substantially as shown and described, and for the purpose set forth.

JAMES E. DEWEESE.

Witnesses:
C. T. DAVIS,
W. I. FISHER.